United States Patent
Mizukami et al.

(10) Patent No.: US 7,362,838 B2
(45) Date of Patent: Apr. 22, 2008

(54) SYNCHRONIZATION METHOD AND SYSTEM, AND DECODER

(75) Inventors: Kenichi Mizukami, Kanagawa (JP); Hiroshi Odanaga, Kanagawa (JP)

(73) Assignee: Sony Corporation, Tokyo (JP)

( * ) Notice: Subject to any disclaimer, the term of this patent is extended or adjusted under 35 U.S.C. 154(b) by 896 days.

(21) Appl. No.: 10/658,825

(22) Filed: Sep. 8, 2003

(65) Prior Publication Data

US 2004/0109519 A1 Jun. 10, 2004

(30) Foreign Application Priority Data

Sep. 9, 2002 (JP) ............... 2002-262522

(51) Int. Cl.
*H04L 7/04* (2006.01)
(52) U.S. Cl. .................................... 375/362
(58) Field of Classification Search ........... 375/240.28, 375/354, 362, 364; 386/111; 348/500; 713/400
See application file for complete search history.

(56) References Cited

U.S. PATENT DOCUMENTS 6,049,886 A * 4/2000 Motoyama ................ 713/400
6,477,204 B1 * 11/2002 Fukushima et al. .... 375/240.28
6,710,814 B1 * 3/2004 Ueno et al. ................ 348/500
2002/0150392 A1 * 10/2002 Yoo et al. .................... 386/111

FOREIGN PATENT DOCUMENTS

| JP | 8 251580 | 9/1996 |
|---|---|---|
| JP | 9 247135 | 9/1997 |
| JP | 10 210019 | 8/1998 |
| JP | 10 257038 | 9/1998 |
| JP | 11 136224 | 5/1999 |
| JP | 2001 45051 | 2/2001 |

* cited by examiner

*Primary Examiner*—Don N Vo
(74) *Attorney, Agent, or Firm*—Frommer Lawrence & Haug LLP; William S. Frommer; Thomas F. Presson

(57) ABSTRACT

In a system for encoding, transmitting, and decoding data in real time, irrespective of the jittering in a transmission path and the encoding bit rate used, synchronization is established between encoder end decoder ends with ease and reliability in the present invention. A change of a difference 'd' between STC (output value of STC counter) at the decoder end and SCR extracted from an encoding stream (MPEG2-PS) is integrated over a given time. Depending on whether the integrated value is positive or negative, a determination is made whether the data processing speed at the decoder end is faster than the encoder end. When the integrated value is positive, the input clock frequency of the STC counter at the decoder end is reduced, and when the integrated value is negative, the input clock frequency thereof is increased.

25 Claims, 12 Drawing Sheets

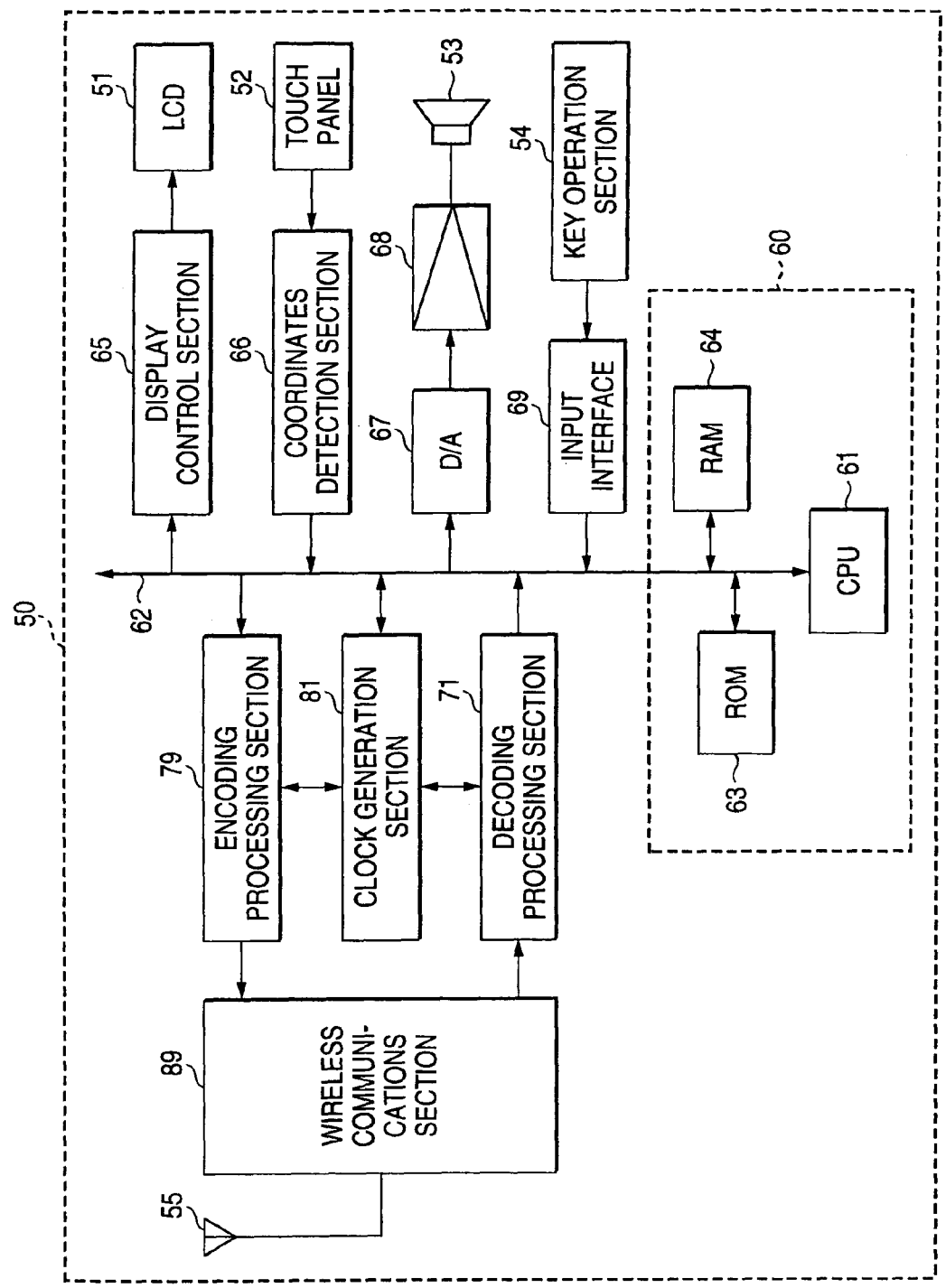

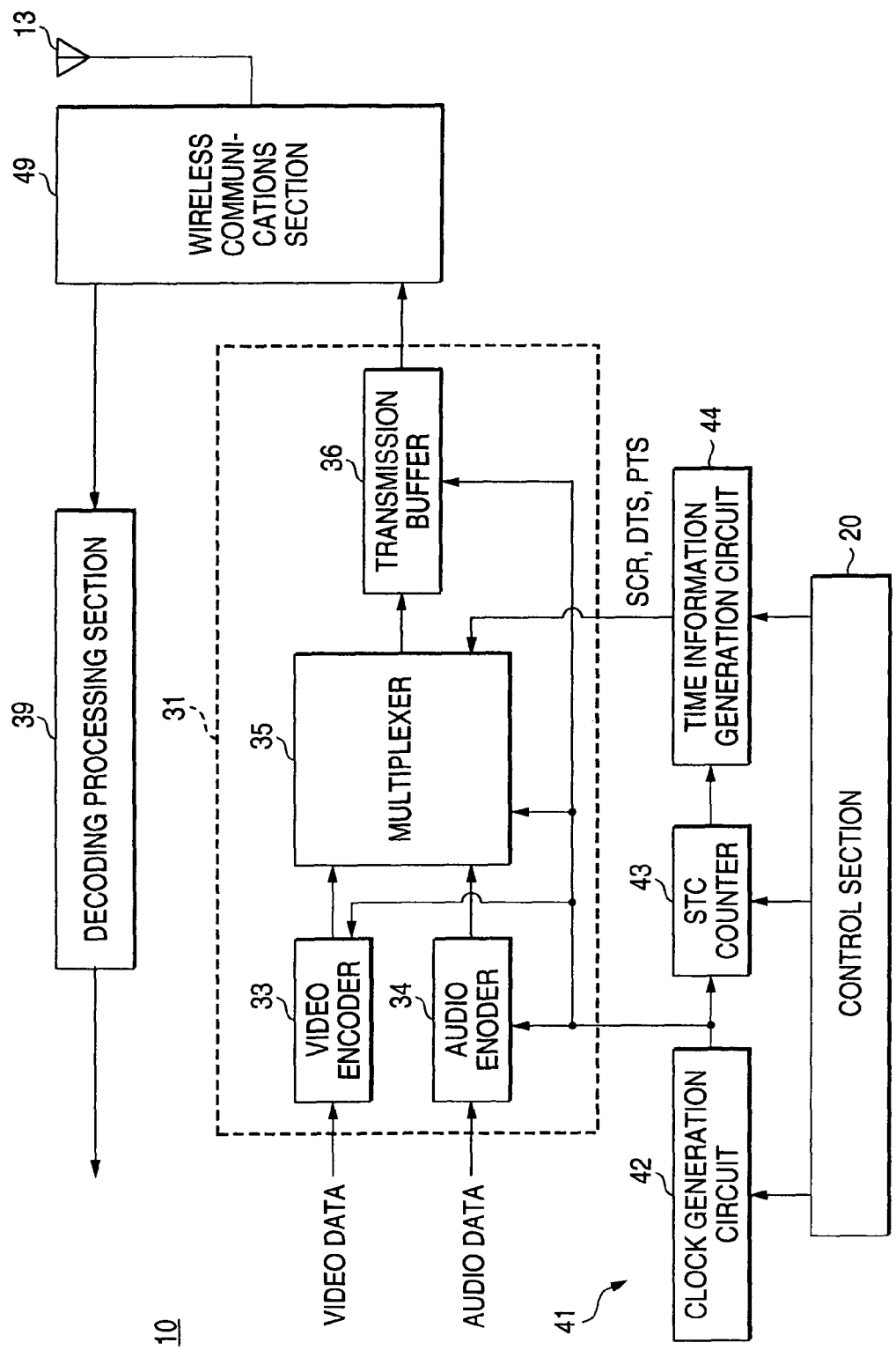

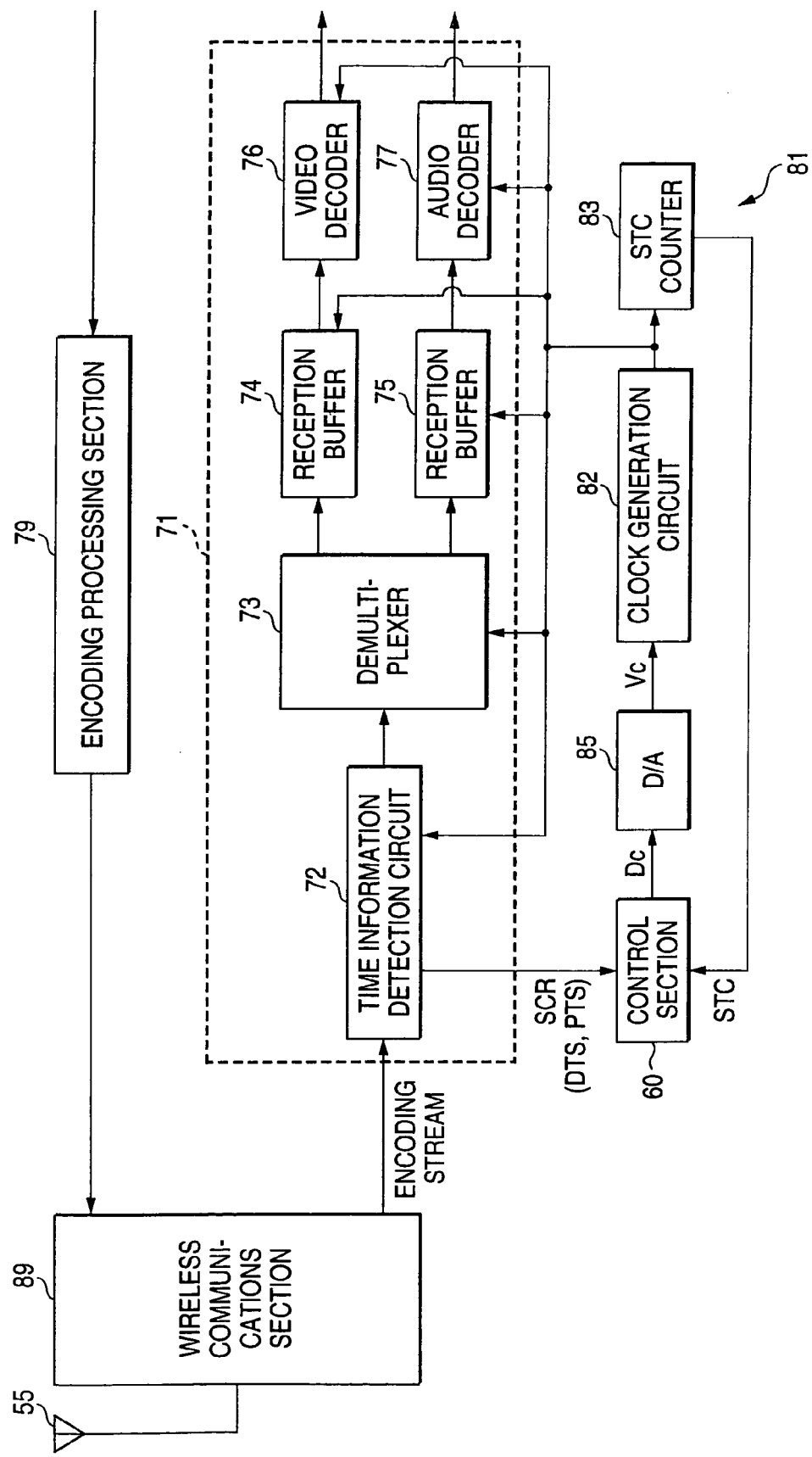

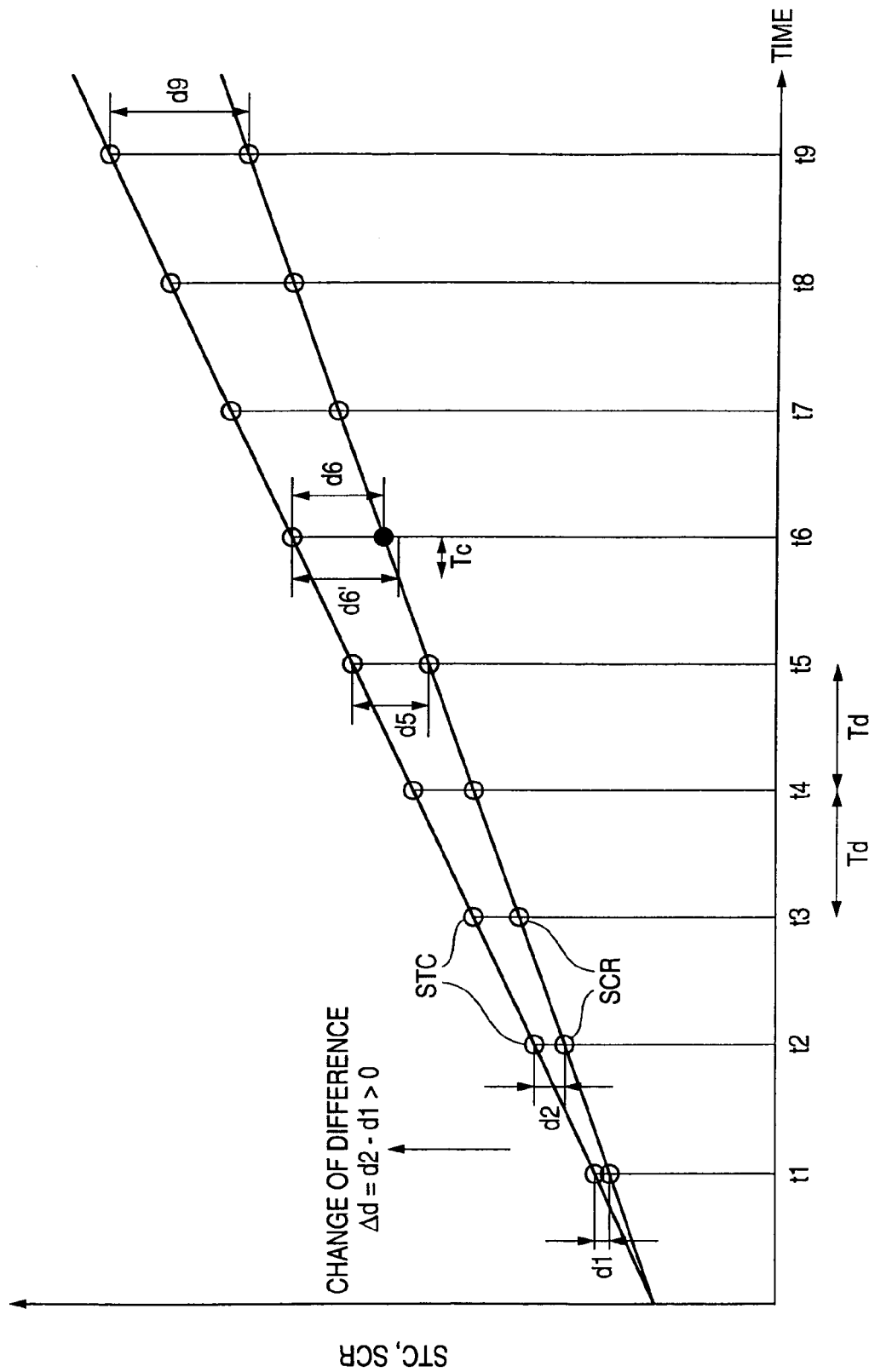

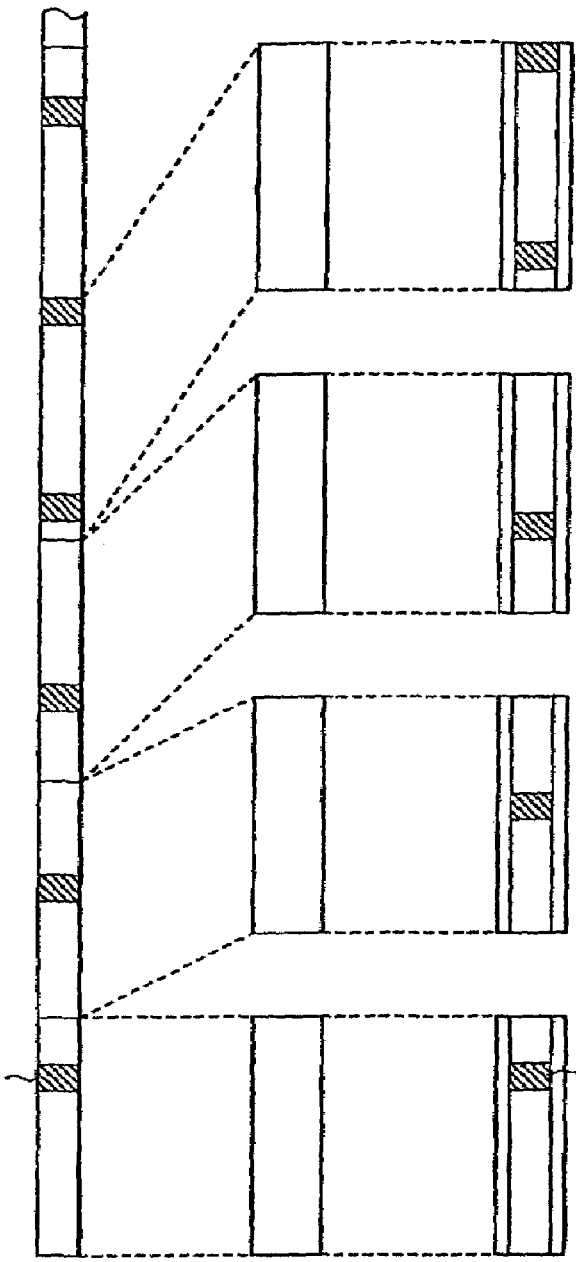
FIG. 12A  ENCODING STREAM TO BE SENT OUT
FIG. 12B  PACK SIZE OF TRANSMISSION PATH AND TRANSMISSION TIMING
FIG. 12C  PACKET SIZE FOR TRANSMISSION PATH
FIG. 12D  ENCODING STREAM AT RECEPTION END
RELATED ART

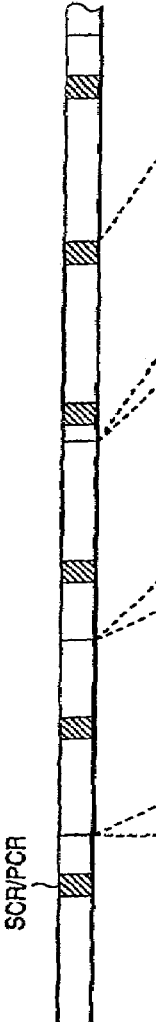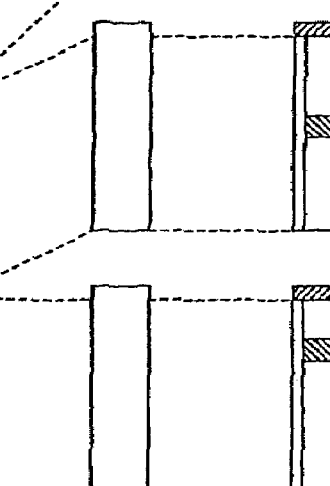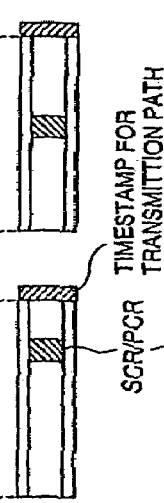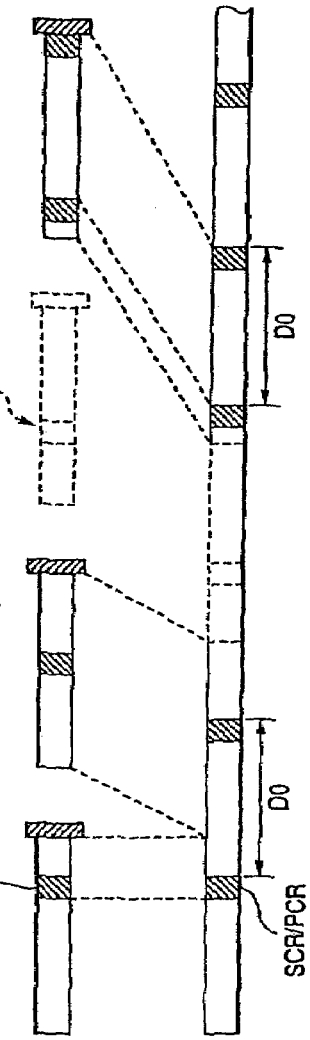
FIG. 13A ENCODING STREAM TO BE SENT OUT
FIG. 13B PACK SIZE OF TRANSMISSION PATH AND TRANSMISSION TIMING
FIG. 13C PACKET SIZE FOR TRANSMISSION PATH
FIG. 13D ENCODING STREAM JUST RECEIVED AT RECEPTION END
FIG. 13E ENCODING STREAM CORRECTLY RECONSTRUCTED
RELATED ART

SYNCHRONIZATION METHOD AND SYSTEM, AND DECODER

BACKGROUND OF THE INVENTION

1. Field of the Invention

The present invention relates to a synchronization system for achieving real-time encoding, transmission, and decoding of data such as video data and audio data, and a method for synchronizing an encoder and a decoder in the synchronization system.

2. Description of the Related Art

In a system including an encoder for compressing data such as video data and audio data in real time, and a decoder for decompressing the data in real time, the encoded data is temporarily stored in a buffer before transmission to prevent data excess or shortage at the decoder end. In the system, the encoder and the decoder are located some distance away from each other, and the data is transmitted in real time from the encoder to the decoder.

In such a system, however, if the encoder at the transmission end and the decoder at the reception end are controlled totally independently, it may cause problems as below sooner or later.

For example, in a case where the decoder is faster in data processing speed than the encoder, the data stored in the buffer may end up being totally decoded sometime soon, causing buffer underflow resulting from no data to be decoded.

On the other hand, if the encoder is faster in data processing speed than the decoder, the buffer may end up overflowing with the data, causing buffer overflow and resulting in data loss.

In view thereof, for correct data decoding, the encoder and decoder have to be synchronized with each other.

To establish synchronization between the encoder and decoder, in an MPEG-2 (Moving Picture Experts Group Phase 2) system, MPEG2-PS (Program Stream) uses SCR (System Clock Reference) and MPEG2-TS (Transport Stream) uses PCR (Program Clock Reference) as reference time information. Here, the reference time information is an index value for reference time. This favorably leads to correct data decoding without causing overflow and underflow of a buffer used for temporary storage.

To be specific, at the time of encoding in the MPEG-2 system, SCR or PCR is generated based on STC (System Time Clock) being an output value of an STC counter for counting encoder clocks. Then, as shown in the upper part of FIG. 11, the resulting SCR or PCR is inserted into an encoding stream at regular time intervals.

At the decoder end, thus inserted SCR or PCR is detected for comparison with STC (output value of the STC counter) at the decoder end as shown in the lower part of FIG. 11. If the comparison result tells that an error therebetween is equal to a certain value or larger, the value of SCR or PCR is loaded to the STC counter so as to correct the STC in value. Thus, the time interval between STCs at the decoder end remains constant except when STC is corrected in value by SCR or PCR.

Further, at the time of encoding in the MPEG-2 system, also inserted into the encoding stream are DTS (Decoding Time Stamp) and PTS (Presentation Time Stamp). Here, DTS is time management information about decoding, and PTS (Presentation Time Stamp) is time management information about reproduction output. At the decoder end, data decoding and output are managed through comparison among DTS, PTS, and STC.

The problem here is that, if the transmission path of the encoding stream jitters, this causes jittering also to SCR or PCR itself being the reference time information. As a result, synchronization control as above cannot be correctly carried out using SCR or PCR.

Considered now is a case exemplified in FIGS. 12A to 12D. That is, an encoding stream including SCRs or PCRs inserted thereto at regular time intervals as shown in FIG. 12A is packetized for transmission as shown in FIG. 12C. For transmission, used are a pack size and a transmission timing as shown in FIG. 12B. Here, the communication protocol to be used is TCP/IP (Transmission Control Protocol/Internet Protocol), for example. In such a case, if packet loss occurs in the transmission path, SCRs or PCRs in the encoding stream may not be received at the same time intervals at the receiver end as shown by D1, D2, and D3 in FIG. 12D. As a result, time correction cannot be done with accuracy.

As a solution of such a problem, JP-A-11-215494 and JP-A-2000-92130 disclose a method for time correction through addition of a timestamp (time information) to packets in a transmission path. Here, used for the transmission path is IEEE1394 serial interface, for example.

With this method, an encoding stream including SCRs or PCRs inserted thereto at regular time intervals as shown in FIG. 13A is packetized for transmission as shown in FIG. 13C. For transmission, used are a pack size and a transmission timing as shown in FIG. 13B. At the time of transmission, the timestamp for the transmission path is added to the corresponding packet.

Thus, even if the encoding stream just received at the receiver end becomes the one as shown in FIG. 13D due to packet loss, for example, the timestamp is used for time control of the encoding stream. In this manner, as denoted by D0 in FIG. 13E, SCRs or PCRs in the encoding stream can be located at the same time intervals, leading to correct data decoding.

With such a method of adding a timestamp to packets in the transmission path exemplarily using IEEE1394 serial interface, however, there arises also a problem of considerable increase of the entire system cost.

As a solution of such a problem, JP-A-2002-165148 notes the fact that the data storage amount in a buffer changes depending on a difference between the data processing speed at the encoder end and that at the decoder end. That is, if the data processing speed at the encoder end is faster than that at the decoder end, the data storage amount in a buffer increases. Conversely, if the data processing speed at the decoder end is faster than that at the encoder end, the data storage amount in a buffer decreases. Accordingly, disclosed in the publication is monitoring the data storage amount in a buffer, and when the amount exceeds an upper threshold value, increasing the clock frequency for decoding and the data processing speed at the decoder end. When the amount falls short of a lower threshold value, decreasing the clock frequency for decoding and the data processing speed at the decoder end.

[Patent Document 1]
JP-A-11-215494
[Patent Document 2]
JP-A-2000-92130
[Patent Document 3]
JP-A-2002-165148

The issue here is that, for encoding in the MPEG system, CBR (Constant Bit Rate) and VBR (Variable Bit Rate) are both applicable, and VBR is popular therefor.

When VBR is used, the data amount shows a change per a second. As a result, the data storage amount in a buffer does not respond to a difference between the data processing speed at the encoder end and that of the decoder end.

Thus, with the method of JP-A-2002-165148 for detecting a difference of the data processing speed between the encoder and decoder ends using the data storage amount of a buffer, the difference detection cannot be performed with accuracy, resulting in failure to synchronize the decoder end to the encoder end with reliability.

Even if CBR is used, with the method, the difference of the data processing speed between the encoder and decoder ends cannot still be accurately detected from the data storage amount of a buffer. This is because, exemplarily in a case of wirelessly transmitting an encoding stream, if packet loss or data garbling occurs during transmission, the corresponding data is not stored in the buffer.

SUMMARY OF THE INVENTION

In view thereof, in a system for encoding, transmitting, and decoding in real time data such as video data and audio data, an object of the present invention is to establish synchronization between an encoder end and a decoder end with ease and reliability no matter if jittering occurs in a transmission path and no matter what encoding bit rate is used.

A first aspect of the present invention is directed to a method for synchronizing between a transmitter and a receiver in a communications system. The method includes: a transmission step of transmitting transmission data after inserting information about a reference time thereto at the transmitter end; a clock comparison step of calculating, at the receiver end, a differential value between a count value of a decoder clock and the reference time of the transmission data; and a clock adjustment step of adjusting a frequency of the decoder clock based on the differential value.

According to a second aspect, in the first aspect, the clock comparison step calculates, at predetermined time intervals, the differential value between the count value of the decoder clock and the reference time, and a change amount thereof, and the clock adjustment step adjusts the frequency of the decoder clock based on the change amount.

With the above synchronization method, exemplarily with MPEG-2 system, detected as a difference of data processing speed between the encoder and decoder ends is a temporal change of a difference between STC (output value of an STC counter) at the decoder end and SCR of MPEG2-PS or PCR of MPEG2-TS.

In the above case, even if jittering occurs in a transmission path, the time shown by STC at the decoder end and SCR or PCR in an encoding stream shows no change no matter what encoding bit rate is used. Accordingly, the difference of the data processing speed between the encoder and decoder ends can be accurately detected.

As such, by controlling the frequency of a decoder clock or that of an encoder clock depending on a temporal change direction of the difference, synchronization can be successfully established between the encoder and decoder ends.

Here, the time at the encoder and decoder ends are not accurate as absolute time, and an error therebetween is merely falling in a certain range. The point here is that, as a time adjustment method for a system transmitting video data and audio data, it is enough if the error range allows video viewing and audio hearing without causing irregularity thereto.

Moreover, unlike the method in which a packet in a transmission path is added with a timestamp therefor, the above synchronization method does not increase the system cost. What is better, the encoder and decoder ends can be successfully synchronized together using only in-specs information such as MPEG-2.

BRIEF DESCRIPTION OF THE DRAWINGS

FIG. 4 is a diagram showing an exemplary function block structure of the display terminal;

FIG. 5 is a diagram showing exemplary encoding processing section and clock generation section of the base device;

FIG. 6 is a diagram showing exemplary decoding processing section and clock generation section of the display terminal;

FIG. 7 is a diagram illustrating a synchronization method of the present invention;

FIGS. 12A to 12D are diagrams all illustrating a case where jittering occurs in a transmission path; and FIGS. 13A to 13E are diagrams all illustrating a case of using a timestamp for the transmission path.

DESCRIPTION OF THE PREFERRED EMBODIMENTS (Summary of System Embodiment: FIGS. 1 to 4)

As an embodiment of the present invention, described below is a case of applying the present invention to a system including a base device and a display terminal. In the system, the base device including a tuner for television broadcasting encodes video and audio data in real time, and the encoded result is wirelessly transmitted in real time to the display terminal as an encoding stream of an MPEG-2 system, and then the display terminal decodes the encoding stream in real time.

Also in the system, through connection between the base device and a telephone line via a modem, and through wireless communications between the display terminal and the base device, the display terminal is connected to the Internet via the base device, enabling e-mail transmission and reception.

Figure 1:
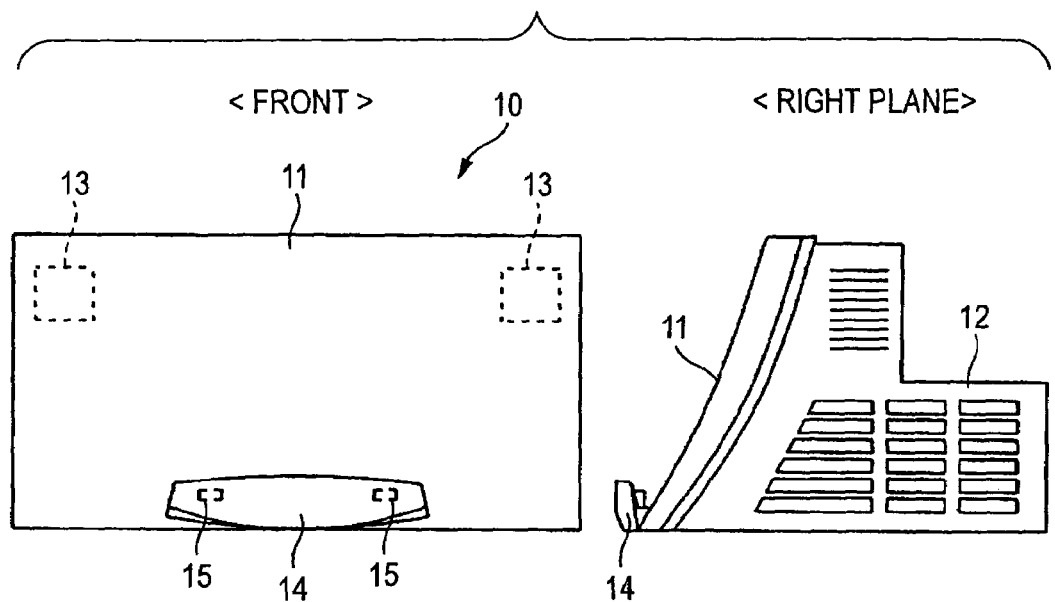
FIG. 1 is a diagram showing the outside structure of a base device configuring a system of an embodiment.
Figure 2:
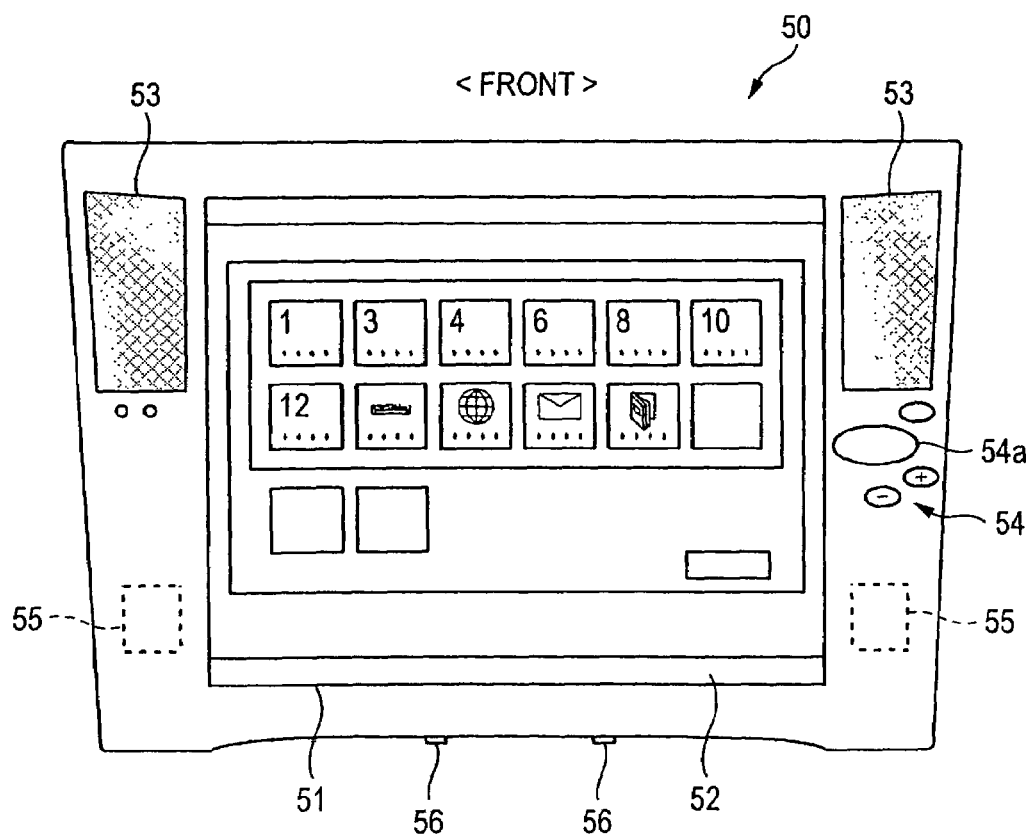
FIG. 2 is a diagram showing the outside structure of a display terminal configuring the system of the embodiment.

(Outside Structures of Base Device and Display Terminal FIGS. 1 and 2)

FIG. 1 shows the outside structure of an exemplary base device, and FIG. 2 shows the outside structure of an exemplary display terminal.

A base device 10 is configured by a front section 11 and a rear section 12 as a piece. The front section 11 is tilted toward the rear, and the upper right and left parts thereof are each provided with an antenna 13 for wireless communications with a display terminal 50. The lower middle part of the front section 11 is provided with a support base 14 for making the display terminal 50 lean against the base device 10. Inside of the support base 14 includes a pair of charge terminals 15.

The lower rear part of the rear section 12 is provided with various terminals such as an antenna terminal and a line terminal, both of which will be described later.

To the front part of the display terminal 50, provided is an LCD (liquid crystal display) 51 including a touch panel 52 on its display screen. The LCD 51 is provided with a speaker 53 in upper right and left part thereof, respectively. Below each of the speakers 53, an antenna 55 is provided for wireless communications with the base device 10.

To the front right part of the display terminal 50, i.e., beneath the speaker 53, provided is a key operation section 54 including an index button 54a, and the like.

Depressing the index button 54a will display such an index screen as exemplarily shown on the LCD 51 in the drawing. A user may use a touch pen or his/her finger to touch whichever menu option he/she likes. Responding to the user touch, television channel selection, connection to the Internet, e-mail writing and sending, or the like, can be accordingly done.

At the bottom of the display terminal 50, a pair of charge terminals 56 are provided. On the right side of the display terminal 50, a slot (not shown) is provided for inserting a memory card thereto.

At the rear of the display terminal 50, a U-shaped support (not shown) is attached to be retractable to make the display terminal 50 stand alone. To a part enclosed by the support, a battery accommodation section is provided to accommodate a battery therein.

The display terminal 50 is used by hand holding, by pulling out the support to make it stand alone at an appropriate tilting angle on any suitable plane, or by making it lean against the front section 11 of the base device 10.

When the display terminal 50 is leaned against the base device 10 for use, the battery accommodated in the display terminal 50 can become charged by the base device 10. This is possible by the charge terminals 56 provided to the display terminal 50 contacting and being connected to the charge terminals 15 of the base device 10.

Figure 3:
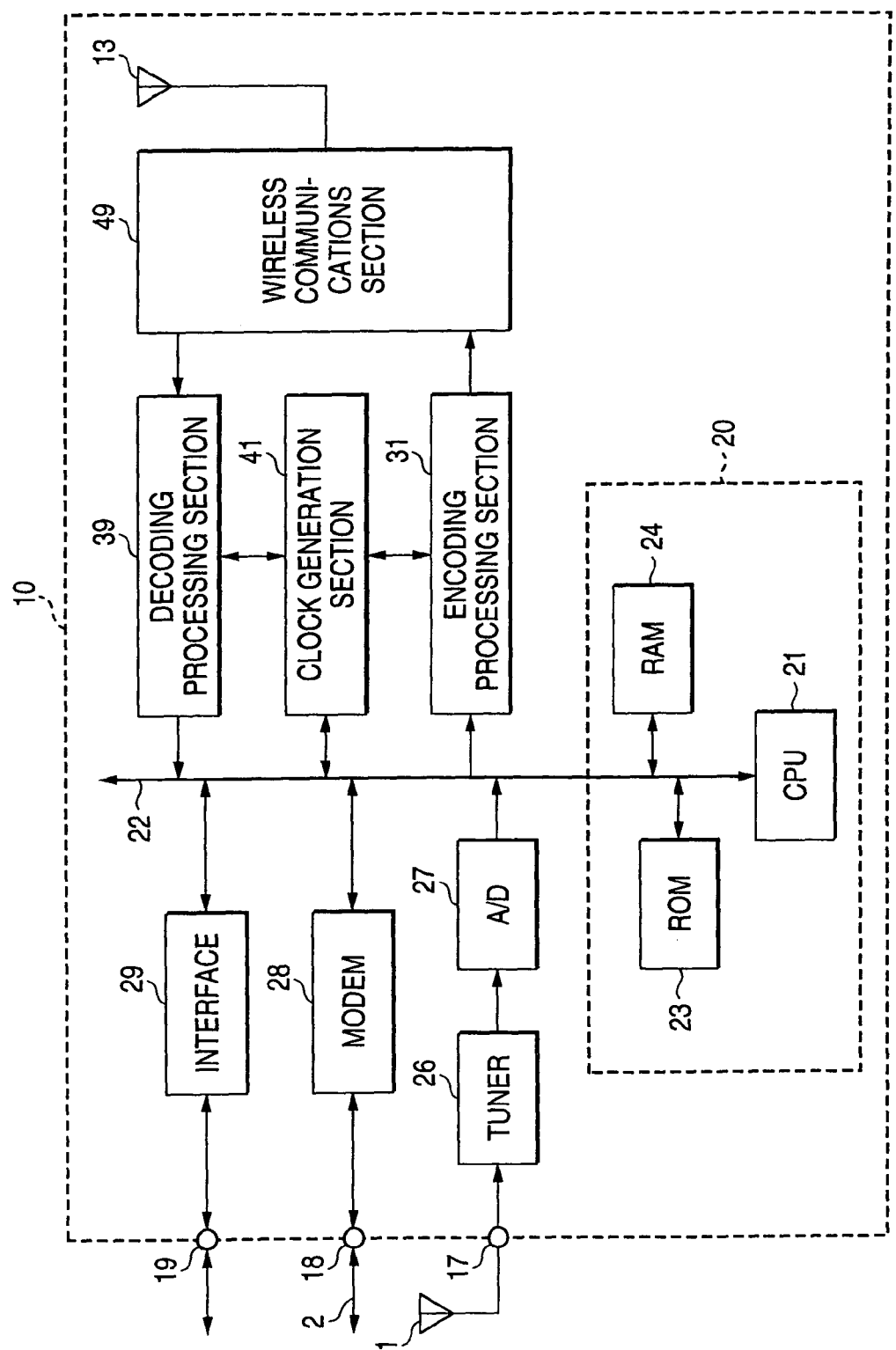
FIG. 3 is a diagram showing an exemplary function block structure of the base device.

(Function Block Structures of Base Device and Display Terminal: FIGS. 3 and 4)

FIG. 3 shows an exemplary function block structure of the base device 10. A control section 20 includes a CPU 21, and to a bus 22 thereof, ROM 23 and RAM 24 are connected, for example. Here, the ROM 23 includes programs to be executed by the CPU 21, any needed fixed data, and the like. The RAM 24 functions as a work area for the CPU 21.

To an antenna terminal 17, connected is an antenna 1 for television broadcasting, and a television broadcasting signal received by the antenna 1 is demodulated for channel selection by a tuner 26. After demodulation, the resulting video signal and audio signal are converted into digital video data and digital audio data by an A/D converter 27 for sending out to the bus 22.

A line terminal 18 connected with a telephone line 2 is connected to the bus 22 via a modem 28. To provide support for broadband connections, the bus 22 is connected via an interface 29 with an Ethernet (trademark) terminal 19 such as ADSL modem or CATV modem for connection establishment.

Also connected to the bus 22 are an encoding processing section 31, a decoding processing section 39, and a clock generation section 41. To the encoding processing section 31 and the decoding processing section 39, connected is a wireless communications section 49, to which the antennas 13 are connected.

The clock generation section 41 includes, as will be described later, a clock generation circuit and an STC counter. The clock generation section 41 is provided for generating clocks for encoding in the encoding processing section 31 and decoding in the decoding processing section 39, and generating information such as SCR or PCR, DTS, and PTS. Herein, SCR or PCR is reference time information, DTS is time management information for decoding, and PTS is another time management information for reproduction output.

The wireless communications section 49 is provided for communications with the display terminal 50 using a communications protocol such as TCP/IP.

The encoding processing section 31 encodes the video and audio data of television broadcasting sent out from the A/D converter 27 to the bus 22. Also, therein, the resulting encoded data is inserted with SCR or PCR, DTS, PTS, and the like, so as to derive an encoding stream of the MPEG-2 system, i.e., MPEG2-PS or MPEG2-TS. The resulting encoding stream is transmitted to the display terminal 50 by the wireless communications section 49.

Any other data derived through the Internet and received e-mail data are also processed in the encoding processing section 31, and then forwarded to the display terminal 50 by the wireless communications section 49 via the bus 22.

Although a detail description will be made later, commands and signals forwarded from the display terminal 50 to the base device 10 are received by the wireless communications section 49, processed by the decoding processing section 39, and then placed on the bus 22. Herein, the commands are those made for television channel selection and Internet connection, and signals are exemplified by transmitting e-mail data.

FIG. 4 shows an exemplary function block structure of the display terminal 50. Therein, a control section 60 includes a CPU 61, and to a bus 62 thereof, ROM 63 and RAM 64 are connected, for example. Here, the ROM 63 includes programs to be executed by the CPU 61, any needed fixed data, and the like. The RAM 64 functions as a work area for the CPU 61.

To the bus 62, the LCD 51 is connected via a display control section 65, and the speakers 53 are also connected via a D/A converter 67 and an audio amplifier circuit 68. Also connected to the bus 62 are the touch panel 52 via a coordinate detection section 66, and the key operation section 54 including such an index button 54a as shown in FIG. 2 via an input interface 69.

Further, the bus 62 is connected with a decoding processing section 71, an encoding processing section 79, and a clock generation section 81. The decoding processing section 71 and the encoding processing section 79 are connected to a wireless communications section 89, to which the antennas 55 are connected.

The clock generation section 81 includes, as will be described later, a clock generation circuit and an STC counter. The clock generation section 81 is provided for generating clocks for encoding in the encoding processing section 79 and decoding in the decoding processing section 71, and generating information such as SCR or PCR, DTS, PTS, and the like.

The wireless communications section 89 is provided for communications with the base device 10 using a communications protocol such as TCP/IP.

In the decoding processing section 71, from the encoding stream having multiplexed with the encoded video data and audio data coming from the base device 10, the encoded video data and audio data are separated for decoding. The decoding result is then sent out onto the bus 62, whereby the LCD 51 displays videos, and the speakers 53 output audio.

Any other data derived through the Internet and received e-mail data forwarded from the base device 10 are also processed in the decoding processing section 71, and then sent out onto the bus 62.

The commands for television channel selection and Internet connection, and signals such as transmitting e-mail data are processed by the encoding processing section 79 of the display terminal 50, and then transmitted to the base device 10 by the wireless communications section 89.

(Embodiment of Synchronization Method: FIGS. 5 to 10)

The synchronization method of the present invention in the above embodiment is described below by exemplifying a case where the encoding stream is MPEG2-PS, and the reference time information is SCR.

FIG. 5 shows exemplary encoding processing section 31 and clock generation section 41 of the base device 10. Therein, the clock generation section 41 is shown only by the encoding processing section 31.

The clock generation section 41 includes a clock generation circuit 42, an STC counter 43, and a time information generation circuit 44. Specifically, the clock generation circuit 42 generates clocks of 27 MHz, which is the system clock frequency in the MPEG-2 system. The SCT counter 43 counts the clocks, and the time information generation circuit 44 generates SCR, DTS, and PTS based on an STC being an output value of the STC counter 43.

In a video encoder 33 and an audio encoder 34 provided in the encoding processing section 31, incoming video data and audio data are both encoded based on the clocks provided from the clock generation circuit 42.

Then, an multiplexer 35 is used to multiplex the resulting two encoded data, and insert thereto SCR, DTS, and PTS. After multiplexing, the resulting encoding stream is sent out to the wireless communications section 49 through a transmission buffer 36, and then forwarded to the display terminal 50.

FIG. 6 shows exemplary decoding processing section 71 and clock generation section 81 in the display terminal 50. Therein, the clock generation section 81 is shown only by the decoding processing section 71.

The clock generation section 81 includes a clock generation circuit 82, an STC counter 83, and a D/A converter 85. In detail, the clock generation circuit 82 generates clocks of 27 MHz that is the system clock frequency in the MPEG-2 system. The STC counter 83 counts the clocks, and the D/A converter 85 converts digital control data Dc into analog control voltage Vc for supply to the clock generation circuit 82. Here, the digital control data Dc is coming from the control section 60 for synchronization, which will be described later.

The clock generation circuit 82 is configured by a VCXO (Voltage Control Crystal Oscillator), and therein, the control voltage Vc is used to convert the output clock frequency into a range centered on 27 MHz, which will be described later.

Then, in the time information detection circuit 72 of the decoding processing section 71, from the encoding stream (MPEG2-PS in this example) provided by the base device 10, SCR, DTS, and PTS are detected and extracted.

Thus extracted SCR is input into the control section 60 together with the STC being an output value of the STC counter 83 for use for synchronization control, as will be described later. The extracted DTS and PTS are also provided to the control section 60 for decoding and time management of reproduction output.

In the decoding processing section 71, the encoding stream output from the time information detection circuit 72 is forwarded to a demultiplexer 73 for separating the encoded video data and audio data therefrom. After the separation, the resulting video data and audio data are supplied, via reception buffers 74 and 75, to a video decoder 76 and an audio decoder 77, in which decoding is done based on the corresponding clocks provided from the clock generation circuit 82.

The control section 60 detects a relative speed difference of the data processing speed between the decoder end and the encoding end. This detection is made based on the temporal change of a difference as a result of deducting SCR extracted from the encoding stream from STC (output value of the STC counter 83) at the decoder end.

FIG. 7 shows a case where the data processing speed at the decoder end is relatively faster than the data processing speed at the encoder end, i.e., a case where the output clock frequency of the clock generation circuit 82 of FIG. 6 is higher than the output clock frequency of the clock generation circuit 42 of FIG. 5. The control section 60 takes in STC and SCR at t1, t2, . . . , having the same time interval Td therebetween so as to detect a change $\Delta d$ of a differenced as a result of deducting SCR from STC.

In the case of FIG. 7, assuming that a difference derived by deducting SCR from STC at t1 is d1, and a difference derived by deducting SCR from STC at t2 is d2, the differences d1 and d2 are increased over the course of time. The change $\Delta d$ (=d2−d1) of the difference at t2 becomes positive.

Figure 8A:
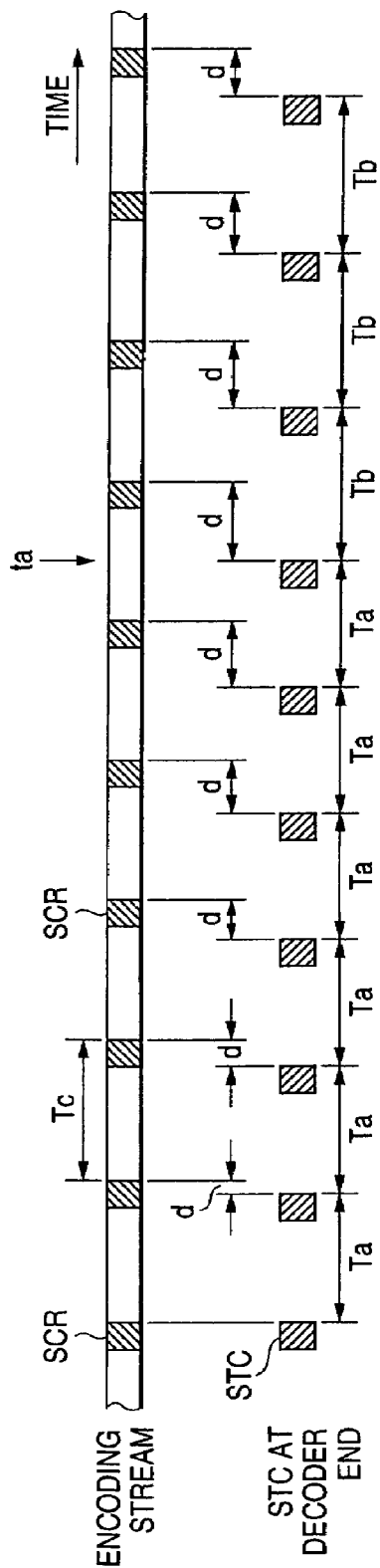
FIGS. 8A and 8B are diagrams both illustrating the synchronization method of the present invention.
Figure 8B:
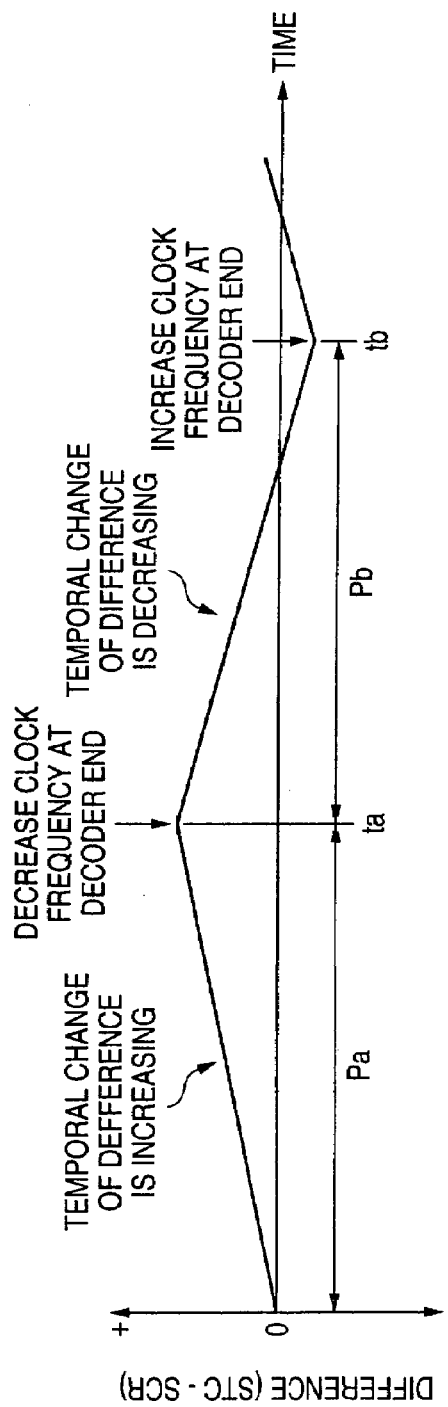

FIGS. 8A and 8B show the change of the difference d, and application of control over the clock frequency, which will be described later.

As shown in FIG. 8A, SCR in the encoding stream is inserted at regular time intervals Tc, and the value (time) changes by a given time. Herein, because an SCR resending period of MPEG2-PS is determined as within 400 m seconds, the time interval Tc is 400 m seconds or shorter.

As shown in FIG. 7, when the data processing speed at the decoder end is relatively faster than the data processing speed at the encoder end, as shown in FIG. 8A before ta, the time interval Ta between STCs at the decoder end changing by a given time becomes shorter than the time interval Tc with SCR. Further, as shown in FIG. 8B by a time period Pa before ta, a difference derived by deducting SCR from STC at the time when STC and SCR are taken in increases over the course of time.

Here, the time interval Td for taking in STC and SCR shown in FIG. 7 is set longer than the SCR resending period Tc shown in FIG. 8A. To be specific, the time interval Td for taking in SCT and SCR may be an integral multiple of the resending period Tc.

Conversely to FIG. 7, when the data processing speed at the decoder end is relatively slower than that of the encoder end, i.e., when the output clock frequency of the clock generation circuit 82 of FIG. 6 is lower than the output clock frequency of the clock generation circuit 42 of FIG. 5, the difference d derived by deducting SCR from STC decreases over the course of time, and the change $\Delta d$ of the difference becomes negative.

Then, the change $\Delta d$ of the difference d as a result of deducting SCR from STC is integrated (averaged) over sufficiently longer time than the time interval Td for taking in STC and SCR. It is then determined whether the resulting integrated value (average value) is positive or negative. If positive, the data processing speed is determined as being relatively faster at the decoder end than the encoder end, and the output clock frequency of the clock generation circuit 82 is reduced by outputting control data as the control data Dc as shown in FIG. 6. In detail, the control data Dc is the one reducing the oscillation frequency of VCXO of the clock generation circuit 82 by a predetermined level.

If the integrated value of the change Δd is negative, the data processing speed is determined as being relatively slower at the decoder end than the encoder end, and the output clock frequency of the clock generation circuit 82 is increased by outputting control data as the control data Dc as shown in FIG. 6. In detail, the control data Dc is the one increasing the oscillation frequency of VCXO of the clock generation circuit 82 by a predetermined level.

Accordingly, in the case of FIGS. 8A and 8B, at ta, the clock frequency at the decoder end is reduced when the integrated value of the change Δd of the defference d is positive, and when the data processing speed is determined as relatively faster at the decoder end than the encoder end.

As a result, conversely to the case of FIG. 7, in a period Pb after ta, the difference d between STC and SCR decreases over the course of time, and the change Δd becomes negative.

Then, at tb, the clock frequency at the decoder end is increased when the integrated value of the change Δd of the deifference d is negative, and when the data processing speed is determined as relatively slower at the decoder end than the encoder end.

As such, depending on whether the integrated value of the change Δd of the difference d is positive or negative, a determination is made at regular intervals whether the data processing speed at the decoder end is relatively faster than that at the encoder end. Depending on the determination result, the clock frequency at the decoder end is controlled in such a manner that the decoder end synchronizes to the encoder end.

If the processing is continued even if the data processing speed remains different between the decoder and encoder ends, the reception buffers 74 and 75 of FIG. 6 will overflow or underflow, resulting in buffer breakdown. In the present embodiment, however, as described above, the data processing speed at the decoder end is changed at a predetermined timing. Thus, the reception buffers 74 and 75 are successfully prevented from breaking down. Here, the data processing speed is not necessarily totally the same between the decoder and encoder ends.

The clock frequency at the decoder end, i.e., the output clock frequency of the clock generation circuit 82 is so controlled as to be in a range centered on 27 MHz, e.g., about 26.9997 MHz to 27.0003 MHz. With such a range, influence to be wielded on videos and audio can be very small.

The time taken for integrating the change Δd of the difference d between STC and SCR, and the sampling number of STC and SCR during the time can be accordingly set depending on the system requirement. As an example, the time may be 1 to 2 seconds, and the sampling number may be in the neighborhood of 10.

As such, the change Δd of the difference d between STC and SCR is integrated (averaged) within a given time to see the tendency of temporal change of the difference d. Then, a determination is made whether or not the data processing speed at the decoder end is faster than that at the encoder end. In such a manner, the integrated value (average value) of the change Δd is capable of correctly showing the tendency of temporal change of the difference d. This is true even if jitter prevents detection of SCR at t6 of FIG. 7 where d6 is supposed to be calculated as the difference d, and resultantly SCR which has been detected before t6 by time Tc and retained in the control section 60 is erroneously regarded as SCR at t6, resulting in d6' including an error being calculated as the difference d at t6.

Figure 9:
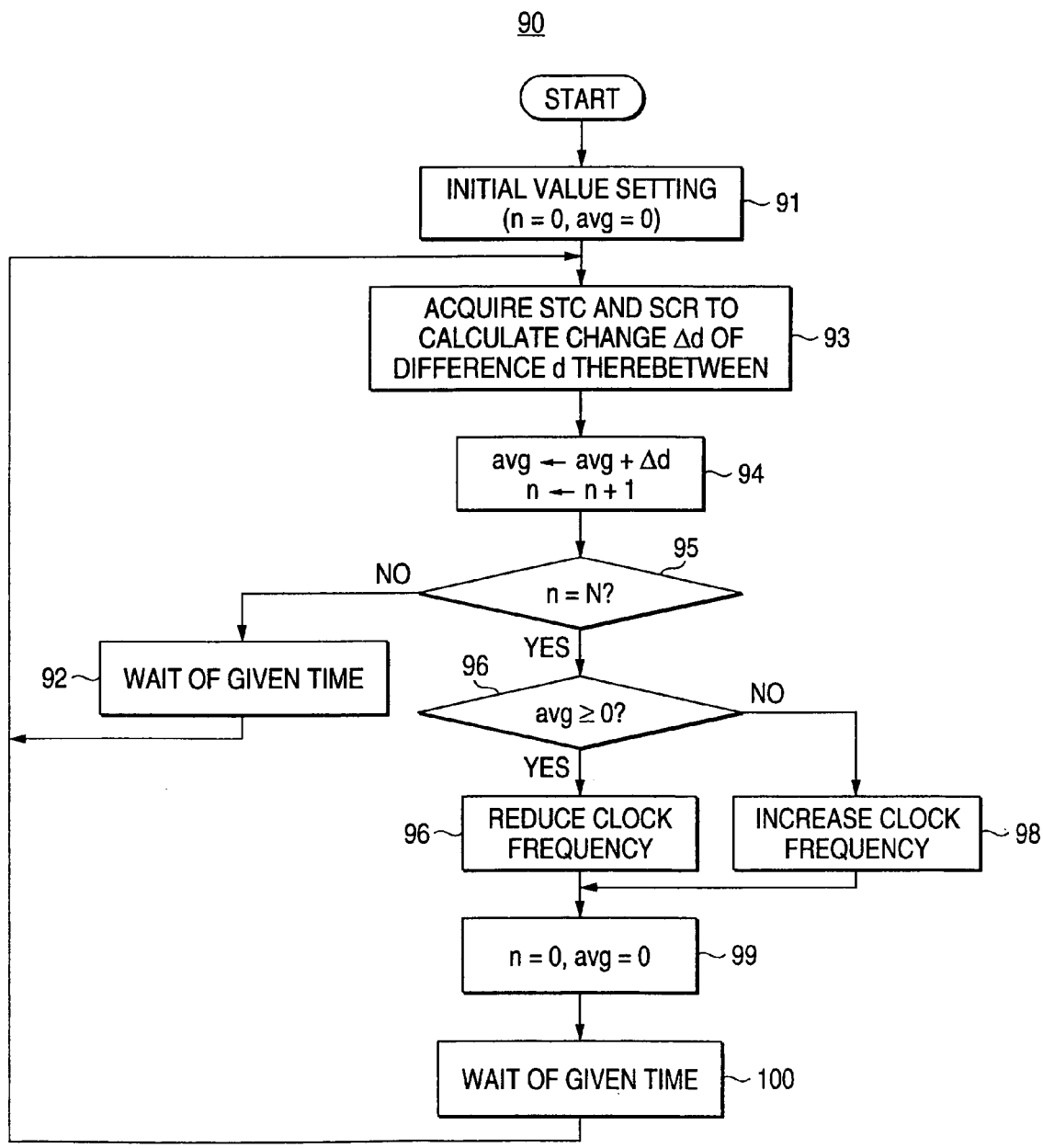
FIG. 9 is a diagram showing an exemplary clock frequency control routine to be executed by a control section at a decoder end.

FIG. 9 shows an exemplary clock frequency control routine to be executed by the control section 60 (CPU 61) of the display terminal 50 in the above embodiment.

Referring to FIG. 9, in a clock frequency control routine 90, first in step 91, an integration order n and an integrated value (average value) avg are both set to be 0 as initial value setting.

Next, in step 93, STC and SCR are both acquired to calculate change Δd of a difference d therebetween. Then in step 94, the resulting change Δd is added to the integrated value avg to derive a new integrated value, and the integration order n is incremented by 1. Then, the procedure goes to step 95.

In step 95, a determination is made where or not the integration order n has reached its maximum value N. The maximum value N is set to be in the neighborhood of 10, as described above.

If the integration order n has not yet reached its maximum value N, the procedure returns from step 95 to 92. After a wait of given time, the procedure returns to step 93 to repeat calculating the change Δd of the difference d in the same integration period, and repeat addition to the integrated value avg immediate before.

If the integrated order n has reached its maximum value N, the procedure goes from step 95 to 96 to determine whether the current integrated value avg is positive (including 0). If positive, the data processing speed at the decoder end is determined as being relatively faster than that at the encoder end, and thus the procedure goes from step 96 to 97 to reduce the output clock frequency in the clock generation circuit 82. If the integrated value avg is negative, the data processing speed at the decoder end is determined as being relatively slower than that at the encoder end, and thus the procedure goes from step 96 to 98 to increase the output clock frequency in the clock generation circuit 82.

After reducing the clock frequency in step 97 or increasing it in step 98, the procedure goes to step 99 to set both the integration order n and the integrated value avg to 0. Then in step 100, after a wait of given time, the procedure returns to step 93 to repeat calculating the change Δd of the difference d in the next integration period, and repeat addition to the integrated value avg immediate before.

The wait time in steps 92 and 100 is preferably so set as to equalize the processing time of a loop of steps 93 to 95 and 92 with the processing time of a loop of steps 93 to 96 and 97, or steps 98 to 100. In a practical sense, the processing time of the latter loop takes longer than the former. Thus, the wait time in step 92 is set longer than that in step 100.

Figure 10:
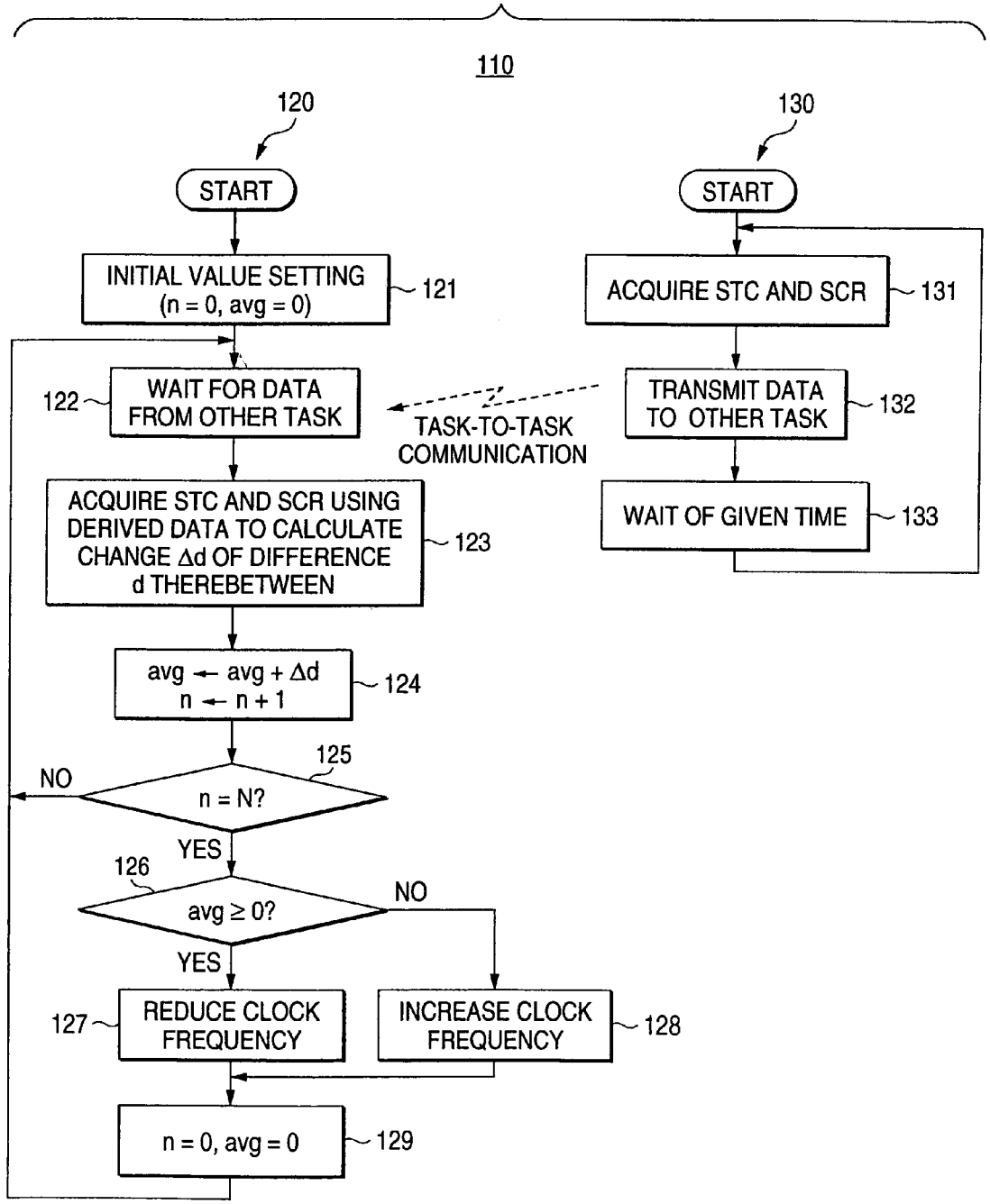
FIG. 10 is a diagram showing another exemplary clock frequency control routine to be executed by the control section at the decoder end.
Figure 11:
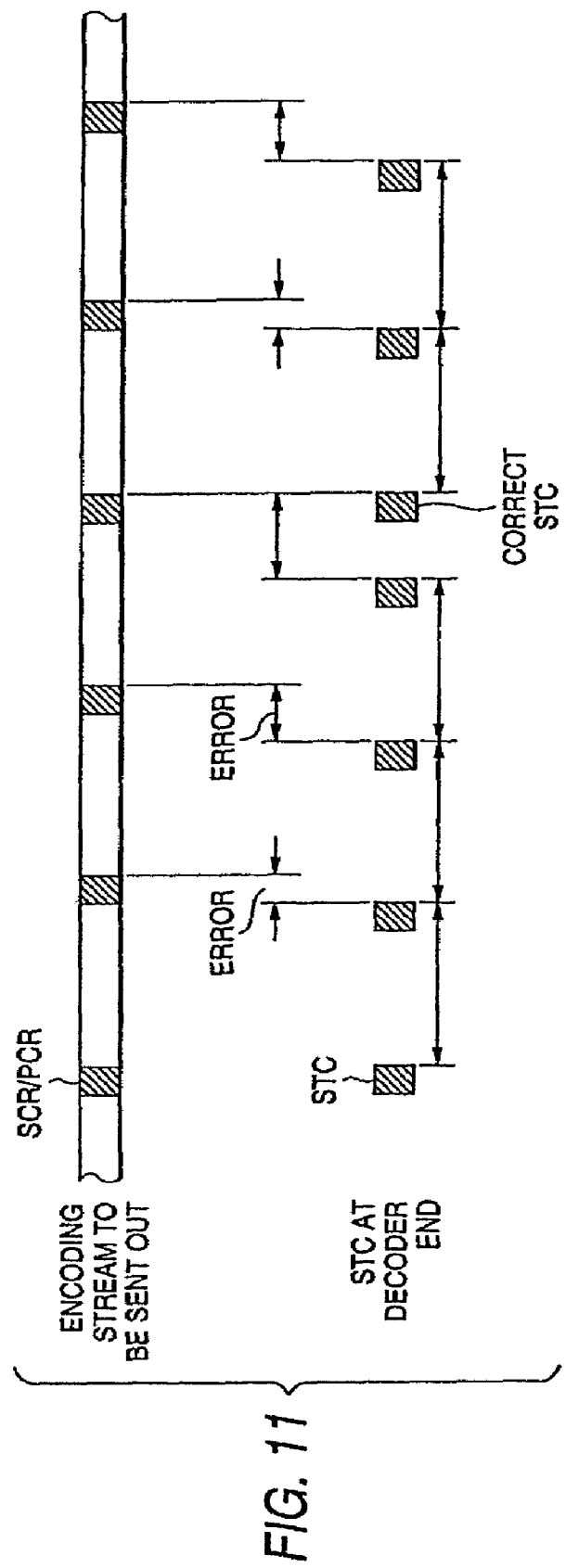
FIG. 11 is a diagram illustrating a synchronization method in an MPEG-2 system.

FIG. 10 shows another exemplary clock frequency control routine to be executed by the control section 60 (CPU 61) of the display terminal 50.

In FIG. 10, in a main processing task 120 of a clock frequency control routine 110, first in step 121, the integration order n and the integrated value (average value) avg are set to be 0 as initial value setting. Then, in step 122, any data from other tasks, i.e., a sub processing task 130, is waited.

In the sub processing task 130, first in step 131, STC and SCR are acquired. Then, in step 132, data transmission is carried out to other tasks, i.e., main processing task 120, through task-to-task communications. After a wait of given time in step 133, the procedure returns to step 131 to repeat acquiring STC and SCR, and repeat transmission to the other tasks.

In the main processing task 120, the procedure goes from step 122 to 123. In step 123, STC and SCR are acquired by the data derived from the sub processing task 130 through task-to-task communications. Then, the change Δd of the difference d as a result of deducting SCR from STC is calculated, then the procedure goes to step 124. The resulting change Δd is added to the integrated value avg to give a new integrated value, and the integration order n is incremented by 1. The procedure then goes to step 125.

In step 125, a determination is made whether or not the integration order n has reached its maximum value N. If the integration order n has not yet reached its maximum value N, the procedure returns from step 125 to 122 to repeat calculating the change Δd of the difference d in the same integration period, and repeat addition to the integrated value avg immediate before.

If the integration order n has reached its maximum value N, the procedure goes from step 125 to 126 to determine whether the current integrated value avg is positive (including 0). If positive, the data processing speed at the decoder end is determined as being relatively faster than that at the encoder end, and thus the procedure goes from step 126 to 127 to reduce the output clock frequency in the clock generation circuit 82. If the integrated value avg is negative, the data processing speed at the decoder end is determined as being relatively slower than that at the encoder end, and thus the procedure goes from step 126 to 128 to increase the output clock frequency in the clock generation circuit 82.

After reducing the clock frequency in step 127 or increasing it in step 128, the procedure goes to step 129 to set both the integration order n and the integrated value avg to 0. Then, the procedure returns to step 122 to repeat calculating the change Δd of the difference d in the next integration period, and repeat addition to the integrated value avg immediate before.

In this example, STC and SCR are acquired in different task, thereby increasing the accuracy on a given time basis.

OTHER EXAMPLES OR EMBODIMENTS

Considered in the above embodiment is a case of controlling the clock frequency at the decoder end. Alternatively, the system may be so configured as to control the clock frequency at the encoder end by sending, to the encoder end, a detection result at the decoder end whether the data processing speed at the decoder end is faster than that at the encoder end.

To be specific, in the embodiment shown in FIGS. 5 and 6, in the control section 60 of the display terminal 50, a result of detecting whether the data processing speed at the decoder end is faster than that at the encoder end is transmitted to the base device 10. Herein, the result transmission is done through wireless communications between the display terminal 50 and the base device 10. Depending on the result, the control section 20 of the base device 10 controls the output clock frequency of the clock generation circuit 42.

In this case, controlled is the clock frequency at the encoder end. Thus, conversely to the above example, the output clock frequency of the clock generation circuit 42 is increased when the integrated value of the change Δd of the difference d is positive, and when the data processing speed is determined as relatively faster at the decoder end than the encoder end. Herein, the difference d is the one derived by deducting SCR extracted from an encoding stream from STC (output value of the STC counter 83) at the decoder end. On the other hand, the output clock frequency of the clock generation circuit 42 is reduced when the integrated value of the change Δd of the difference d is negative, and when the data processing speed is determined as relatively slower at the decoder end than the encoder end.

In the above example, the encoding stream is MPEF2-PS, and the reference time information is SCR. Using the encoding stream of MPEG2-TS, and the reference time information of PCR causes no change.

Further, in the above example, in the system including the base system 10 and the display terminal 50, the base device 10 is regarded as the encoder end due to the encoder processing section 31 of the base device 10 and the decoder processing section 71 of the display terminal 50, and the display terminal 50 is regarded as the decoder end due to the encoder processing section 79 of the display terminal 50 and the decoder processing section 39 of the base device 10. Considered therein is a case of transmitting an encoding stream from the base device 10 to the display terminal 50. The similar method can be used to establish synchronization between the encoder and decoder ends also in a case of transmitting an encoding stream from the display terminal 50 to the base device 10. In this case, the display terminal 50 is regarded as the encoder end due to the encoder processing section 79 of the display terminal 50 and the decoder processing section 39 of the base device 10, and the base device 10 as the decoder end.

Still further, in the above embodiment, the base device 10 can transmit television video data and audio data to the display terminal 50, and the Internet connection is established in the display terminal 50 for transmission and reception of e-mails. The present invention is also applicable to a mere television system, for example, in which television video data and audio data are transmitted from a base device to a display terminal, videos are displayed on a display such as a liquid crystal display or a plasma display of the display terminal, and audio is output from a speaker. Generally applied is a system in which data such as video data and audio data are encoded in real time, the resulting data is transmitted in real time after inserted with reference time information, and decoding is also done in real time.

As described in the foregoing, according to the present invention, in a system for encoding, transmitting, and decoding in real-time data such as video data and audio data, without increasing the system cost, synchronization can be successfully established between the encoder and decoder ends with ease and reliability no matter if jittering occurs in a transmission path and no matter what encoding bit rate is used.

What is claimed is:

1. A method for synchronizing between a transmitter and a receiver in a communications system, the method comprising:
   a transmission step of transmitting transmission data after inserting information about a reference time thereto at the transmitter end;
   a clock comparison step of calculating, at the receiver end, a differential value between a count value of a decoder clock and the reference time of the transmission data; and
   a clock adjustment step of adjusting a frequency of the decoder clock based on the differential value.

2. The synchronization method for the communications system according to claim 1, wherein
   the clock comparison step calculates, at predetermined time intervals, the differential value between the count value of the decoder clock and the reference time, and a change amount thereof, and the clock adjustment step adjusts the frequency of the decoder clock based on the change amount.

3. The synchronization method for the communications system according to claim 2, wherein the clock adjustment step determines, based on the change amount, whether or not the decoder clock is faster than an encoder clock at the transmitter end, and when determined as faster, reduces the frequency of the decoder clock.

4. The synchronization method for the communications system according to claim 3, wherein the clock comparison step calculates the differential value between the count value of the decoder clock and the reference time by deducting the latter from the former, and the change amount, and when the change amount is positive, the clock adjustment step determines the decoder clock as being faster.

5. The synchronization method for the communications system according to claim 2, wherein the clock adjustment step determines, based on the change amount, whether or not the decoder clock is slower than an encoder clock at the transmitter end, and when determined as slower, increases the frequency of the decoder clock.

6. The synchronization method for the communications system according to claim 5, wherein the clock comparison step calculates the differential value between the count value of the decoder clock and the reference time by deducting the latter from the former, and the change amount, and when the change amount is negative, the clock adjustment step determines the decoder clock as being slower.

7. A method for synchronizing between a transmitter and a receiver in a communications system, the method comprising:

a transmission step of transmitting transmission data after inserting information about a reference time thereto at the transmitter end;

a clock comparison step of calculating, at the receiver end, a differential value between a count value of a decoder clock and the reference time of the transmission data; and a clock adjustment step of adjusting a frequency of an encoder clock of the transmitter based on the differential value.

8. The synchronization method for the communications system according to claim 7, wherein the clock comparison step calculates, at predetermined time intervals, the differential value between the count value of the decoder clock and the reference time, and a change amount thereof, and the clock adjustment step adjusts the frequency of the encoder clock based on the change amount.

9. A communications system, comprising:

a transmitter for transmitting transmission data after encoding the same and inserting information about a reference time thereto; and a receiver including:

decoder clock generation means for decoding the transmission data;

clock comparison means for counting the decoder clock, and calculating a differential value between a resulting count value and the reference time; and clock adjustment means for adjusting a frequency of the decoder clock based on the differential value.

10. The communications system according to claim 9, wherein the clock comparison means calculates, at predetermined time intervals, the differential value between the count value of the decoder clock and the reference time, and a change amount thereof, and the clock adjustment means adjusts the frequency of the decoder clock based on the change amount.

11. The communications system according to claim 10, wherein the clock adjustment means determines, based on the change amount, whether or not the decoder clock is faster than an encoder clock at the transmitter end, and when determined as faster, reduces the frequency of the decoder clock.

12. The communications system according to claim 11, wherein the clock comparison means calculates the differential value between the count value of the decoder clock and the reference time by deducting the latter from the former, and the change amount, and when the change amount is positive, the clock adjustment means determines the decoder clock as being faster.

13. The communications system according to claim 10, wherein the clock adjustment means determines, based on the change amount, whether or not the decoder clock is slower than an encoder clock at the transmitter end, and when determined as slower, increases the frequency of the decoder clock.

14. The communications system according to claim 13, wherein the clock comparison means calculates the differential value between the count value of the decoder clock and the reference time by deducting the latter from the former, and the change amount, and when the change amount is negative, the clock adjustment means determines the decoder clock as being slower.

15. The communications system according to claim 9, wherein the transmitter is configured to transmit the transmission data in real time after encoding the same, and the receiver is configured to apply a decoding process to the transmission data in real time based on the decoder clock.

16. The communications system according to claim 15, wherein the transmission data is streaming data at least including video data or audio data.

17. The communications system according to claim 9, wherein the transmitter is configured to transmit the encoded transmission data after converting the same into a radio signal, and the receiver is configured to demodulate the radio signal, and apply a decoding process to the transmission data.

18. A communications system, comprising a transmitter including:

encoder clock generation means for encoding transmission data;

transmission control means for transmitting the transmission data as a result of encoding based on an encoder clock after inserting information about a reference time thereto; and clock adjustment means for adjusting a frequency of the encoder clock, and a receiver including:

decoder clock generation means for decoding the transmission data; and clock comparison means for counting the decoder clock, and calculating a differential value between a resulting count value and the reference time, wherein based on the differential value, the clock adjustment means adjusts the frequency of the encoder clock.

19. The communications system according to claim 18, wherein the clock comparison means calculates, at predetermined time intervals, the differential value between the count value of the decoder clock and the reference time, and a change amount thereof, and the clock adjustment means adjusts the frequency of the encoder clock based on the change amount.

20. A receiver for receiving encoded transmission data to which information about a reference time is inserted, and applying a decoding process thereto, the receiver comprising:

decoder clock generation means for decoding the transmission data;

clock comparison means for counting the decoder clock, and calculating a differential value between a resulting count value and the reference time; and clock adjustment means for adjusting a frequency of the decoder clock based on the differential value.

21. The receiver according to claim 20, wherein the clock comparison means calculates, at predetermined time intervals, the differential value between the count value of the decoder clock and the reference time, and a change amount thereof, and the clock adjustment means adjusts the frequency of the decoder clock based on the change amount.

22. The receiver according to claim 21, wherein the clock adjustment means determines, based on the change amount, whether or not the decoder clock is faster than an encoder clock at the transmitter end, and when determined as faster, reduces the frequency of the decoder clock.

23. The receiver according to claim 22, wherein the clock comparison means calculates the differential value between the count value of the decoder clock and the reference time by deducting the latter from the former, and the change amount, and when the change amount is positive, the clock adjustment means determines the decoder clock as being faster.

24. The receiver according to claim 21, wherein the clock adjustment means determines, based on the change amount, whether or not the decoder clock is slower than an encoder clock at the transmitter end, and when determined as slower, increases the frequency of the decoder clock.

25. The receiver according to claim 24, wherein the clock comparison means calculates the differential value between the count value of the decoder clock and the reference time by deducting the latter from the former, and the change amount, and when the change amount is negative, the clock adjustment means determines the decoder clock as being slower.

* * * * *